United States Patent
Tsirkin (10) Patent No.: US 10,977,064 B2
(45) Date of Patent: Apr. 13, 2021

(54) LIVE VIRTUAL MACHINE MIGRATION

(71) Applicant: Red Hat, Inc., Raleigh, NC (US)

(72) Inventor: Michael Tsirkin, Westord, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/684,650

(22) Filed: Aug. 23, 2017

(65) Prior Publication Data

US 2019/0065227 A1 Feb. 28, 2019

(51) Int. Cl.
*G06F 9/455* (2018.01)

(52) U.S. Cl.
CPC .. *G06F 9/45558* (2013.01); *G06F 2009/4557* (2013.01); *G06F 2009/45595* (2013.01)

(58) Field of Classification Search
CPC ............... G06F 9/2009; G06F 9/4557; G06F 2009/45595; G06F 9/45558; G06F 2009/4557
See application file for complete search history.

(56) References Cited

U.S. PATENT DOCUMENTS

| | | | |
|---|---|---|---|
| 7,013,482 | B1 | 3/2006 | Krumel |
| 7,492,787 | B2 | 2/2009 | Ji et al. |
| 7,761,573 | B2 | 7/2010 | Travostino et al. |
| 8,396,986 | B2 | 3/2013 | Kanada et al. |
| 8,413,147 | B2 | 4/2013 | Shen et al. |
| 8,429,647 | B2 | 4/2013 | Zhou et al. |
| 8,539,045 | B2 | 9/2013 | Kang et al. |

(Continued)

FOREIGN PATENT DOCUMENTS

| | | |
|---|---|---|
| CN | 103299278 A | 9/2013 |
| CN | 105208048 A1 | 12/2015 |

(Continued)

OTHER PUBLICATIONS

Li et al., "HyperMIP: Hypervisor controlled Mobile IP for Virtual Machine Live Migration across Networks", School of Computer Science and Engineering, Beihang University, Beijing, China, accessed, Jun. 28, 2017, 9 pages https://pdfs.semanticscholar.org/661e/4e7dcde6197740184466a16daf7397238184.pdf.

(Continued)

*Primary Examiner* — Wissam Rashid
(74) *Attorney, Agent, or Firm* — Lowenstein Sandler LLP (57) ABSTRACT

Aspects of the disclosure provide for mechanisms for virtual machine migration. A method of the disclosure includes: initiating migration of a virtual machine from an origin computer system to a destination computer system; determining, by a processing device, whether network reconfiguration has been completed for the migration of the virtual machine; stopping, by an origin hypervisor running on the origin computer system, the virtual machine on the origin computer system in response to determining that the network reconfiguration has been completed; and starting, by a destination hypervisor running on the destination computer system, the virtual machine on the destination computer system. In some embodiments, determining whether the network reconfiguration has been completed includes determining whether the designation hypervisor has received a threshold amount of data addressed to the virtual machine.

20 Claims, 6 Drawing Sheets

(56) References Cited

U.S. PATENT DOCUMENTS

| | | | |
|---|---|---|---|
| 8,819,678 B2 * | 8/2014 | Tsirkin | G06F 9/45558 718/1 |
| 8,850,430 B2 | 9/2014 | Hayward et al. | |
| 8,924,560 B2 | 12/2014 | Pang et al. | |
| 8,966,495 B2 | 2/2015 | Kulkarni | |
| 9,008,084 B2 | 4/2015 | Zhang et al. | |
| 9,081,603 B2 | 7/2015 | Zhang et al. | |
| 9,104,460 B2 | 8/2015 | Jansen | |
| 9,141,625 B1 * | 9/2015 | Thornewell | G06F 9/4856 |
| 9,160,668 B2 | 10/2015 | Tripathi et al. | |
| 9,229,755 B2 | 1/2016 | Dow et al. | |
| 9,336,042 B1 * | 5/2016 | Brenneman | H04L 41/0813 |
| 9,350,614 B2 | 5/2016 | Zeng et al. | |
| 9,396,022 B2 | 7/2016 | Miyazaki | |
| 9,424,144 B2 | 8/2016 | Sridharan et al. | |
| 9,565,126 B2 | 2/2017 | Narayanasamy et al. | |
| 9,628,290 B2 | 4/2017 | Banavalikar et al. | |
| 9,836,327 B1 | 12/2017 | Brouwer et al. | |
| 2008/0222375 A1 * | 9/2008 | Kotsovinos | G06F 9/5083 711/162 |
| 2009/0183173 A1 | 7/2009 | Becker et al. | |
| 2011/0134931 A1 | 6/2011 | Merwe et al. | |
| 2012/0110181 A1 * | 5/2012 | Tsirkin | G06F 9/4856 709/226 |
| 2013/0232492 A1 | 9/2013 | Wang | |
| 2013/0238802 A1 | 9/2013 | Sarikaya | |
| 2013/0262647 A1 | 10/2013 | Kurita et al. | |
| 2013/0275592 A1 | 10/2013 | Xu et al. | |
| 2013/0305242 A1 | 11/2013 | Wang et al. | |
| 2014/0007089 A1 | 1/2014 | Bosch et al. | |
| 2014/0025821 A1 | 1/2014 | Baphna et al. | |
| 2014/0289399 A1 | 9/2014 | Shimokuni et al. | |
| 2014/0297889 A1 | 10/2014 | Dong et al. | |
| 2014/0298335 A1 | 10/2014 | Regev et al. | |
| 2015/0029856 A1 | 1/2015 | Rozenberg | |
| 2015/0117256 A1 | 4/2015 | Sabaa et al. | |
| 2015/0222515 A1 | 8/2015 | Mimura et al. | |
| 2015/0309818 A1 | 10/2015 | Lee et al. | |
| 2015/0370596 A1 | 12/2015 | Fahs et al. | |
| 2015/0378759 A1 | 12/2015 | Pershin et al. | |
| 2016/0004548 A1 | 1/2016 | Suzuki et al. | |
| 2016/0070601 A1 | 3/2016 | Yamamoto et al. | |
| 2016/0077935 A1 | 3/2016 | Zheng et al. | |
| 2016/0103699 A1 | 4/2016 | Thakkar et al. | |
| 2016/0117185 A1 | 4/2016 | Fang et al. | |
| 2016/0246632 A1 | 8/2016 | Tsirkin | |
| 2016/0323245 A1 | 11/2016 | Shieh et al. | |
| 2016/0378530 A1 | 12/2016 | Ramasubramanian et al. | |
| 2017/0005923 A1 | 1/2017 | Babakian | |
| 2017/0019328 A1 * | 1/2017 | Moreno | H04L 45/22 |
| 2017/0139742 A1 | 5/2017 | Cropper et al. | |
| 2017/0264496 A1 | 9/2017 | Ao et al. | |
| 2017/0359414 A1 | 12/2017 | Sengupta et al. | |
| 2018/0091591 A1 | 3/2018 | Puri et al. | |

FOREIGN PATENT DOCUMENTS

| | | |
|---|---|---|
| EP | 2698957 B1 | 7/2016 |
| WO | 2012051884 A1 | 4/2012 |
| WO | 2012119390 A1 | 9/2012 |
| WO | 2017210641 A1 | 12/2017 |

OTHER PUBLICATIONS

"A Virtual Machine Loses Network Connectivity after vMotion (1007464)", VMWare Knowledge Base, Nov. 29, 2016, 2 pages https://kb.vmware.com/selfservice/microsites/search.do?language=en_US&cmd=displayKC&externalId=1007464.

Wang et al., "Virtual Routers on the Move: Live Router Migration as a Network-Management Primitive", Princeton University, Princeton, NJ, USA; AT&T Labs—Research, Florham Park, NJ, USA, Aug. 17-22, 2008, 12 pages http://www.cs.princeton.edu/courses/archive/fall10/cos561/papers/VROOM08.pdf.

Cully et al., "Remus: High Availability via Asynchronous Virtual Machine Replication", Department of Computer Science The University of British Columbia, accessed Jun. 27, 2017, 21 pages https://www.usenix.org/legacy/event/nsdi08/tech/full_papers/cully/cully_html/.

Gigamon, "Network Monitoring for Virtual Server Environments", Solution Brief, https://www.gigamon.com/sites/default/files/resources/solutions/sb-network-monitoring-for-virtual-server-environments-3115.pdf, 2014, 2 pages.

Vaes, Karim, "Azure: How to Prepare for Maintenance Impacting your Virtual Machines", The insights of a Quirky Cloud Solution Architect on his Journey Through the Fast Paced IT Landscape, http://kvaes.wordpress.com/2017/02/13/azure-how-to-prepare-for-maintenance-impacting-your-virtual-machines/, Feb. 13, 2017, 6 pages.

Nachum, Youval, et al. "Scaling the Address Resoultion Protocol for Large Data Center (SARP)", http://tools.ietf.org/id/draft-nachum-sarp-04.txt, Feb. 24, 2013, 15 pages.

Nobel, Rickard, "The vSwitch Notify Switches Setting", Rickard Nobel Vmware, Window, Storage and Networking, http://rickardnobel.se/vswitch-notifiy-switches-setting/ Jul. 14, 2012, 6 pages.

Microsoft Corporation, "Simplify Virtual Machine Management and Migration with Ethernet Fabrics in the Datacenter", http://www.brocade.com/content/dam/common/documents/content-types/whitepaper/brocade-ms-ethernet-fabric-solution-blueprint.pdf, Mar. 2011, 20 pages.

Stuart, Morgan, "Mitigating Interference During Virtual Machine Live Migration through Storage Offloading", retrived from http://scholarscompass.vcu.edu/cgi/viewcontent.cgi?referer=https://www.google.co.in/&httpsredir=1&article=5724&,context=etd, Virginia Commonwealth University, Richmond, Virginia, USA, Dec. 2016, 71 pages.

Shen, Zhiming, et al., "Follow the Sun through the Clouds: Application Migration for Geographically Shifting Workloads", retrived from https://pdfs.semanticscholar.org/e76e/6d0753a4136337f1d10d94257825bd7a1cfd.pdf, Cornell University, In SoCC. ACM, Oct. 5-7, 2016, 14 pages.

Vmware, "Move a Virtual Machine to a New Location or Host", Jul. 28, 2017, 1 page.

Silvera et al,, "IP Mobility to Support Live Migration of Virtrual Machines Across Subnets", SYSTRO May 4-6, 2009, 10 pages.

Kalim et al., "Seamless Migration of Virtual Machines Across Networks", IEEE, 2013, 7 pages.

Bifulco, et al., "Transparent Migration of Virtual Infrastructures in Large Datacenters for Cloud Computing", IEEE, 2011, pp. 179-184.

USPTO, Notice of Allowance for U.S. Appl. No. 15/691,522, dated Jun. 24, 2019.

USPTO, Office Action for U.S. Appl. No. 15/691,605, dated Jun. 13, 2019.

USPTO, Office Action for U.S. Appl. No. 15/688,791, dated Mar. 21, 2019.

USPTO, Office Action for U.S. Appl. No. 15/835,151, dated May 2, 2019.

USPTO, Office Action for U.S. Appl. No. 15/900,396, dated Feb. 25, 2019.

* cited by examiner

LIVE VIRTUAL MACHINE MIGRATION

TECHNICAL FIELD

The implementations of the disclosure relate generally to computer systems and, more specifically, to methods and systems for virtual machine migration.

BACKGROUND

A virtualized computing system can include one or more host machines and run one or more hypervisors on the host machines. Each hypervisor can support one or more virtual machines, with each of the virtual machines running one or more applications under a guest operating system. From time to time, a virtual machine in the virtualized computer system may be moved (e.g., migrated) from one host machine to another host machine for a variety of reasons, such as load balancing on the host machines, upgrades of software and/or hardware of the host machines, etc.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the disclosure provide for mechanisms for virtual machine migration in a computer system. A virtual machine residing on a host computer system (e.g., the origin host computer system) may be migrated to a different host computer system (e.g., the destination host computer system). During the migration, the virtual machine can be disassociated from the origin hypervisor running on the origin host computer system and can be associated with the destination hypervisor running on the destination computer system. The network location of the virtual machine is considered as changed after the migration. Network devices in the network to which the new hypervisor is coupled may need to be notified of the virtual machine's new association with the new hypervisor so that the virtual machine can continue to communicate with the network devices after migration. For example, while a media access control (MAC) address and/or an Internet Protocol (IP) address of the virtual machine may not have to be changed after the migration, one or more network devices (e.g., one or more data link layer switches) may need to be reconfigured to facilitate communications for the virtual machine. More particularly, for example, the destination host and the origin host may be connected to different switches and/or different switch ports. When the virtual machine is migrated to the destination host, the switch ports to which the destination host is connected may need to be reconfigured to be associated with the virtual machine.

Prior solutions for virtual machine migration rely on network notifications (e.g., notifications including a media access control (MAC) address of the virtual machine) to announce the new location of the virtual machine. For example, the destination hypervisor may broadcast such notifications as the origin hypervisor on behalf of the virtual machine undergoing migration. However, these notification packets may be lost or delayed during transmission. As a result, the destination hypervisor may need to retransmit the notifications. This may cause significant downtime and negative performance impact for an end user of the virtual machine.

Aspects of the disclosure address the above deficiencies by providing mechanisms (e.g., systems, methods, machine-readable media, etc.) for live virtual machine migration. The mechanisms can move a virtual machine from an origin host computer system to a destination host computer system without disrupting the guest operating system on the virtual machine and the applications executed by the virtual machine. The live migration of the virtual machine can involve copying the virtual machine execution state from the origin computer system to the destination computer system. The virtual machine execution state may include, for example, the memory state, the virtual processor state, the virtual devices state, and/or the network connectivity state of the virtual machine.

In some embodiments, the origin hypervisor can perform one or more operations to complete an initial stage of the migration process. For example, the origin hypervisor can transmit the data related to the virtual machine (e.g., the execution state of the virtual machine) to the destination hypervisor while the virtual machine is still running on the origin host computer system. Network reconfiguration can be conducted, for example, by configuring one or more switches (e.g., switches connected to the destination host) to associate one or more new switch ports with the virtual machine. Each of the switches can associate a data link layer address of the virtual machine with the switch port(s). The origin hypervisor can then determine whether the network reconfiguration has been completed for the migration process. For example, the origin hypervisor can determine whether the destination hypervisor has received a threshold amount of data addressed to the virtual machine. In response to determining that the destination hypervisor has received the threshold amount of data (e.g., a threshold number of data packets), the origin hypervisor can determine that the network reconfiguration has been completed. Alternatively, the origin hypervisor can determine that the network reconfiguration is incomplete in response to determining that the destination hypervisor has not received the threshold amount of data.

Upon detecting completion of the network reconfiguration, the origin hypervisor can initiate the final of the migration process. For example, the origin hypervisor can stop the virtual machine on the origin computer system, while the destination hypervisor can resume the virtual machine on the destination computer system.

Figure 1A:
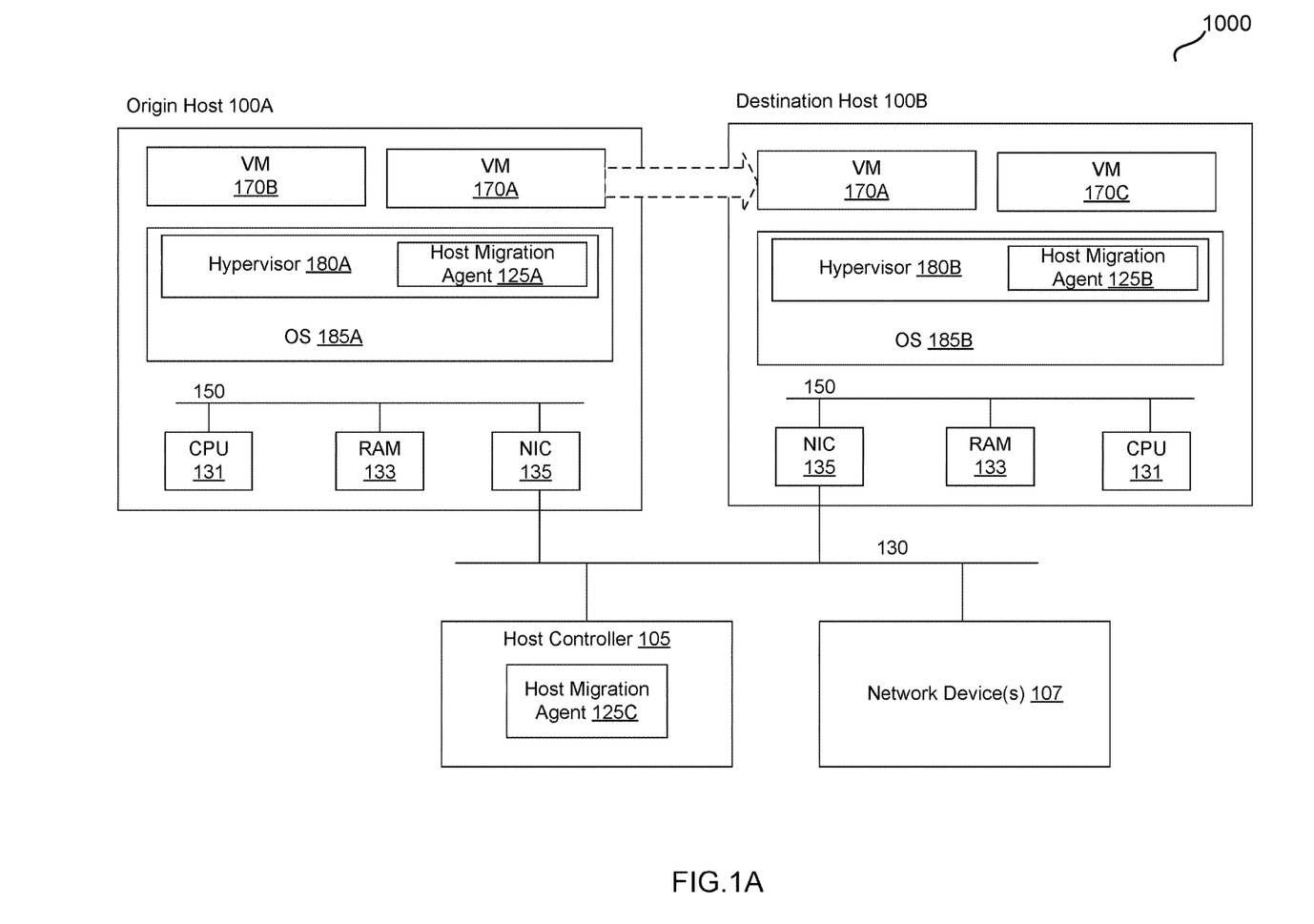
FIG. 1A is a block diagram of a network architecture in which implementations of the disclosure may operate.

FIG. 1A is a block diagram of an example 1000 of a computer system according to some embodiments of the present disclosure. Computer system 1000 can include one or more computer systems, such as host computer systems 100A, 100B in accordance with one or more aspects of the present disclosure. "Computer system" as used herein may be and/or include a system comprising one or more processors, one or more memory devices, and one or more input/output (I/O) interfaces.

As illustrated in FIG. 1A, host computer systems 100A and 100B may be interconnected via a network 130. Network 130 can include a private network (e.g., a local area network (LAN)), a wide area network (WAN), intranet, etc.), a public network (e.g., the Internet), etc.

Each host computer system 100A, 100B may comprise one or more processors 131 communicatively coupled to a memory device 133 and a network interface controller (NIC) 135. Local connections within host computer system 100A, 100B, including connections between processor 131, memory device 133, and NIC 135, may be provided by one or more local buses 150 of a suitable architecture.

"Processor" or "processing device" as used herein may be and/or include a device capable of executing instructions encoding arithmetic, logical, or I/O operations. In one illustrative example, a processor may follow a Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. According to another aspect of the disclosure, a processor may be implemented as a single integrated circuit, two or more integrated circuits, or may be a component of a multi-chip module (e.g., in which individual microprocessor dies are included in a single integrated circuit package and hence share a single socket). A processor may also be a central processing unit (CPU) in some embodiments.

"Memory device" herein may be and/or include a volatile or non-volatile memory device, such as RAM (random-access memory), ROM (read-only memory), EEPROM (electrically erasable programmable read-only memory), or any other device capable of storing data.

"I/O device" herein may be and/or include a device capable of providing an interface between a processor and an external device capable of inputting and/or outputting binary data.

"Network interface controller" (NIC) herein may be and/or include a computer hardware component that connects a computer to a computer network. An NIC may include electronic circuitry required to communicate with other networked devices using specific physical layer and data link layer standards.

As illustrated in FIG. 1A, each host computer system 100 (e.g., host 100A, 100B) may run multiple virtual machines 170 (e.g., virtual machines 170A, 170B, 170C, etc.) by executing a software layer 180 (e.g., software layer 180A, 180B), often referred to as "hypervisor," above the hardware and below the virtual machines. In certain implementations, hypervisor 180 may be a component of operating system 185 (e.g., operating systems 185A, 185B) executed by the corresponding host computer system 100. Alternatively, hypervisor 180 may be provided by an application running under host operating system 185, or may run directly on the corresponding host computer system 100 without an operating system beneath it. Hypervisor 180 may abstract the physical layer, including processors, memory, I/O devices, etc. and present this abstraction to virtual machines 170 as virtual devices, including virtual processors, virtual memory, virtual I/O devices, etc. Host migration agents 125A, 125B running on the respective host computer system 100A, 100B may perform virtual machine migration management functions in accordance with one or more aspects of the present disclosure. In certain implementations, a host migration agent may be implemented as a software component invoked by hypervisor 180A, 180B. Alternatively, functions of host migration agent 125A, 125B may be performed by hypervisor 180A, 180B.

As schematically illustrated by FIG. 1A, each of host computer systems 100A and 100B may be communicatively coupled to a host controller 105 which may reside on a designated computer system or on one of the hosts 100A, 100B. The host controller 105 may manage a plurality of virtual machines, including the virtual machines 170A, 170B, and 170C. The host controller 105 may create a virtual machine, delete a virtual machine, and perform any other virtual machine management functions. In certain implementations, the host controller 105 may include a host migration agent 125C which may manage live migration of virtual machines between host computer systems 100A and 100B in accordance with one or more aspects of the present disclosure.

In some embodiments, one or more network devices 107 may be communicatively coupled to one or more computer systems in system 1000. For example, each network device 107 can be communicatively coupled to host computer systems 100A and/or 100B via network 130 or any other suitable network. In some embodiments, a network device 107 may be internal to a host computer system (e.g., host 100A, 100B). Alternatively, a network device 107 may be external to the host computer system. Each of the network devices 107 may include a hardware device, an emulated device (e.g., an emulated device in a hypervisor), a software device, or a combination of the above. A network device 107 can include, for example, a switch, a bridge, a network interface card, a router, and/or any other device that can facilitate data transmission for one or more computer systems.

Virtual machine 170A may be migrated from host computer system 100A (also referred to herein as the "origin host computer system") to host computer system 100B (also referred to herein as the "destination host computer system"). During the migration, virtual machine 170A (also referred to herein as the "migrating virtual machine") can be disassociated from hypervisor 180A (also referred to herein as the "origin hypervisor") and can be associated with hypervisor 180B (also referred to herein as the "destination hypervisor"). The migration process can be initiated in response to receiving a request for virtual machine migration from a user (e.g., a system administrator). The migration process can also be initiated automatically by the origin hypervisor. The migration process may be initiated by performing any operation to migrate virtual machine 170A from the origin computer system to the destination computer system. The migration of virtual machine 170A can be a live migration in some embodiments. For example, the migration can be performed while virtual machine 170A is still running on the origin host computer system 100A. Virtual machine 170A is not disconnected from its applications and/or clients during the migration.

The migration of virtual machine 170A can be completed in one or more stages. An initial stage of the migration may involve performing one or more copying operations for virtual machine 170A. For example, the host migration agents 125A and/or 125C may copy, over the network 130, an execution state of the migrating virtual machine 140 from the origin host 110 to the destination host 120. The virtual machine execution state may include the memory state, the virtual processor state, the virtual devices state, the connectivity state, etc. of virtual machine 170A. The execution state may include one or more memory pages in some embodiments. The host migration agent 125B can receive the execution state of virtual machine 170A and can store the received execution state. The copying operation can be performed while virtual machine 170A is still running on the origin host 100A. Upon completion of the copying operation, the host migration agent 125A and/or 125C may re-copy one or more of the memory pages that have been modified during the copying operation.

Origin hypervisor 180A may receive a notification from virtual machine 170A undergoing migration. The notification may comprise one or more data link layer addresses (e.g., Media Access Control (MAC) addresses) associated with one or more virtual network interfaces 135 of virtual machine 170A. In certain implementations, the notification may further comprise one or more VLAN identifiers associated with one or more virtual network interfaces 135 of virtual machine 170A. In an illustrative example, VLAN identifiers associated with one or more virtual network interfaces 135 of virtual machine 170A may conform to IEEE 802.1Q standard defining defines a system of VLAN tagging for Ethernet frames and procedures to be followed by data link layer devices (bridges and switches) in handling such frames. In an illustrative example, a VLAN identifier may be provided by a 32-bit field inserted between the source MAC address and the EtherType/length fields of the original Ethernet frame.

Responsive to receiving the notification from virtual machine 170A, origin hypervisor 180A may forward the notification to destination hypervisor 180B. In some embodiments, origin hypervisor 180A may store the received notification in a memory location which is mapped into the address space of virtual machine 170A, and thus the notification will be transmitted to destination host 100B as part of the state of virtual machine 170A. Alternatively, origin hypervisor 180A may encapsulate the notification into a message which is transmitted to destination hypervisor 180B over network 130.

Responsive to receiving the notification from origin hypervisor 180A, destination hypervisor 180B may generate one or more notification messages to announce the new location of virtual network interfaces of virtual machine 170A, in order to ensure successful delivery of data link layer frames addressed to virtual machine 170A residing at destination host 100B. In some embodiments in which virtual machine 170A has two or more virtual network interfaces 135, a separate notification message may be constructed for each virtual network interface 135, and may be broadcasted over network segment 130 to which the corresponding virtual network interface 135 is connected.

In an illustrative example, the destination hypervisor 180B may generate a notification message for the migration of virtual machine 170A by appending one or more data link layer and/or network layer headers to the body of the notification message that has been received from the origin hypervisor. Each notification message may comprise a data link layer address (e.g., a MAC address) associated with a virtual network interface of the virtual machine. In certain implementations, each notification message may further comprise a VLAN identifier associated with the virtual network interface.

Network reconfiguration can be conducted in view of the notification message. For example, responsive to receiving the notification message, one or more data link layer devices (such as Ethernet switches and/or bridges) may update their respective internal data structures employed for data link layer frame forwarding, to reflect the new location of the network interface associated with the data link layer address specified by the notification message. More particularly, for example, the data link layer device(s) may associate one or more switch ports with the virtual machine (e.g., by associating a data link layer address of the virtual machine with the switch port(s)). In some embodiments, the network reconfiguration can be conducted by performing one or more operations described in connection with FIG. 2 below.

In some embodiments, the host computer systems 100A and/or 100B may iteratively perform copying operations for the migration of virtual machine 170A (e.g., by copying the modified memory pages) until a pre-defined condition has been met, indicating completion of the initial stage of the migration process. For example, the pre-defined condition may include a memory pages modifying rate becoming less than a pre-defined threshold rate. As another example, the pre-defined condition may include the memory pages modifying rate being less than or equal to the network throughput. As still another example, the pre-defined condition may be represented by the ratio of the memory pages modifying rate to the virtual machine state transfer rate becoming less than or equal to a pre-defined threshold ratio.

In one example, the memory pages modifying rate may be defined as the size of the memory pages which became modified since the start of the last copying operation. In another example, the memory pages modifying rate may be defined as the size of the memory pages which are becoming modified in a unit of time. The virtual machine state transfer rate may accordingly be defined as the amount of data that may be transmitted from the origin host to the destination host over the network since the start of the last copying operation, or as the amount of data that may be transmitted from the origin host to the destination host over the network in a unit of time. In one example, the virtual machine state transfer rate may be represented by the theoretical maximum amount of data which may be transmitted from the origin host to the destination host over the network (e.g., based on the data link layer throughput). Alternatively, the virtual machine state transfer rate may be represented by the observed amount of data which have actually been transmitted from the origin host to the destination host over the network (e.g., based on the average size of data transmitted over a pre-defined period of time).

The origin hypervisor 180A and the destination hypervisor 180B can relay data for the migrating virtual machine upon completion of the initial stage of the migration. The data may include, for example, data transmitted from the migrating virtual machine 170A to one or more network devices (also referred to herein as the "outgoing data"). The data may also include data addressed to the migrating virtual machine 170A (also referred to herein as the "incoming data"). For example, the host migration agent 125A can forward, to the host migration agent 125B, an outgoing data packet transmitted by the migrating virtual machine 170A. The host migration agent 125B can then transmit the outgoing data packet to one or more network devices to which the outgoing data packet is addressed. As another example, upon receiving an incoming data packet addressed to the migrating virtual machine 170A, the host migration agent 125B can forward the incoming data packet to the host migration agent 125A. The host migration agent 125A can then forward the incoming data packet to the migrating virtual machine 170A.

While relaying data for the migrating virtual machine, the origin hypervisor 180A, the destination hypervisor 180B, and/or the host controller 105 can determine whether network reconfiguration has been completed for the migration of the virtual machine. This determination can be made, for example, based on the data relayed for the migrating virtual machine 170A. More particularly, for example, the origin hypervisor 180A, the destination hypervisor 180B, and/or the host controller 105 can determine that the network reconfiguration has been completed in response to determining that the destination hypervisor 180B has received a threshold amount of data addressed to the migrating virtual machine 170A. Similarly, the origin hypervisor 180A, the destination hypervisor 180B, and/or the host controller 105 can determine that the network reconfiguration has not been completed in response to determining that the destination hypervisor 180B has not received the threshold amount of data addressed to the migrating virtual machine. In a more particular example, the origin hypervisor 180A, the destination hypervisor 180B, and/or the host controller 105, can determine that the destination hypervisor 180B has received a threshold amount of data that is addressed to the migration virtual machine in response to determining that the destination hypervisor 180B has received a threshold number of incoming data packets addressed to the migrating virtual machine. As another example, the origin hypervisor 180A, the destination hypervisor 180B, and/or the host controller 105 can determine that the network reconfiguration has been completed in response to determining that the destination hypervisor 180B has received, from a threshold number of remote sources (e.g., network devices), data addressed to the migrating virtual machine. As still another example, the origin hypervisor 180A, the destination hypervisor 180B, and/or the host controller 105 can determine that the network reconfiguration has been completed in response to determining that the destination hypervisor 180B receives a threshold number of data packets during a predetermined time period (e.g., a second).

In some embodiments, the host migration agent 125B can determine the completion status of the network reconfiguration and can generate one or more messages indicating the completion status (e.g., a message indicative of completion of the network reconfiguration, a message indicative of incompletion of the network reconfiguration, etc.). The host migration agent 125B can then transmit the messages to the host migration agent 125A and/or 125C. Alternatively or additionally, the host migration agent 125B can transmit, to the host migration agent 125A and/or 125C, information related to the amount of incoming data received by the destination hypervisor 180B. The host migration agent 125A and/or 125C can then determine the completion status of the network reconfiguration in view of the information.

In response to determining that the network reconfiguration has been completed, origin hypervisor 180A, destination hypervisor 180B, and/or host controller 105 can initiate the final stage of the migration process. For example, host migration agents 125A and/or 125C can stop the migrating virtual machine 170A on the origin host 100A. The host migration agents 125A and/or 125C can also copy one or more remaining modified memory pages related to virtual machine 170A (e.g., memory pages that have been modified during the migration process) to the destination hypervisor.

The host migration agent 125B and/or 125C can start (e.g., resume) the virtual machine 170A on the destination host 100B. In the final stage, a page fault may be generated by the origin hypervisor responsive to detecting the virtual machine's attempt to access a memory page which has not yet been transferred, and the page may be transferred from the origin hypervisor to the destination hypervisor responsive to the page fault.

Figure 1B:
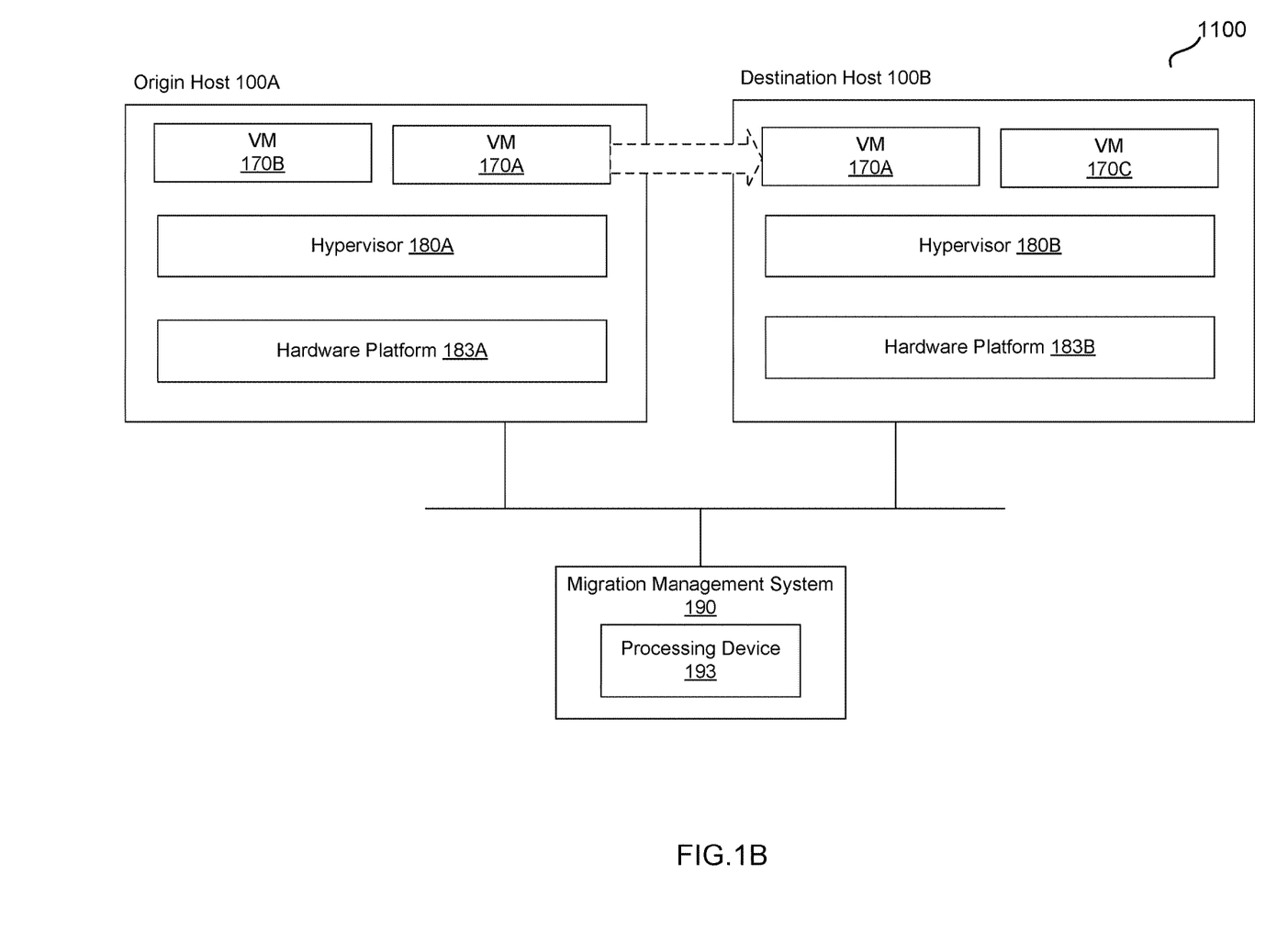
FIG. 1B is a block diagram illustrating an example of a system for virtual machine migration according to some implementations of the disclosure.

FIG. 1B is a block diagram of an example 1100 of a system for virtual machine migration according to some implementations of the disclosure. As illustrated, system 1100 can include one or more host computer systems (e.g., original host 100A, destination host 100B, etc.) and a migration management system 190. Each of the host computer systems may be and/or include a host computer system as descried in connection with FIG. 1A above. For example, a host computer system 100 (original host 100A, destination host 100B) can host one or more virtual machines (VMs) 170 (e.g., VMs 170A, 170B, 170C) which may run under control of a hypervisor 180 (hypervisor 180A, 180B). The hypervisor 180 may emulate the underlying hardware platform 183 (e.g., hardware platform 183A, 183B) of the host computer system 100 for the VMs. The hypervisor 180 may also be known as a virtual machine monitor (VMM) or a kernel-based hypervisor. In some implementations, the hypervisor 180 is part of an operating system (OS) of the host computer system 100 (e.g., a host OS). In some embodiments, hardware platform 183 can include any suitable hardware components, such as one or more processors 131, memory devices 133, and network interface controllers 135 as described in connection with FIG. 1A.

Migration management system 190 can perform various functions for virtual machine migration according to some embodiments of the present disclosure. Migration management system 190 can include one or more computer systems (e.g., one or more computer systems 500 of FIG. 5.). In some embodiments, migration management system 190 can communicate with original host 100A and/or destination host 100B via a network (e.g., network 130 of FIG. 1A). One or more portions of migration management system can reside on one or more host computer systems of system 1010 (e.g., original host 100A, destination host 100B).

As illustrated in FIG. 1B, migration management system 190 can include a processing device 193. In some embodiments, processing device 193 is coupled to one or more memory devices. Processing device 193 can initiate migration of a virtual machine (e.g., VM 170A) from origin host computer system 100A to destination computer system 100B. Processing device 193 can also determine whether network reconfiguration has been completed for the migration of the virtual machine. In some embodiments, in response to determining that the network reconfiguration has been completed, processing device 193 can stop the virtual machine on the origin computer system and start the virtual machine on the destination computer system. To determine whether the network reconfiguration has been completed, processing device 193 may determine whether the destination hypervisor 180B has received a threshold amount of data addressed to the virtual machine.

In some embodiments, in response to determining that the network reconfiguration has not been completed, processing device 193 can relay data for the virtual machine. For example, processing device 193 can receive, from destination hypervisor 180B, a first data packet addressed to the virtual machine; and transmit, via origin hypervisor 180A, the first data packet to the virtual machine. As another example, processing device 193 can receive, from the virtual machine, a second data packet addressed to a network device (e.g., a network device 107 of FIG. 1A); and transmit, to destination hypervisor 180B, the second data packet. Processing device 193 can further to transmit, via destination hypervisor 180B, the second data packet to the network device. In some embodiments, processing device 193 can also transmit, to one or more network devices, notification messages including information related to the migration of the virtual machine (e.g., a MAC of the virtual machine).

Figure 2:
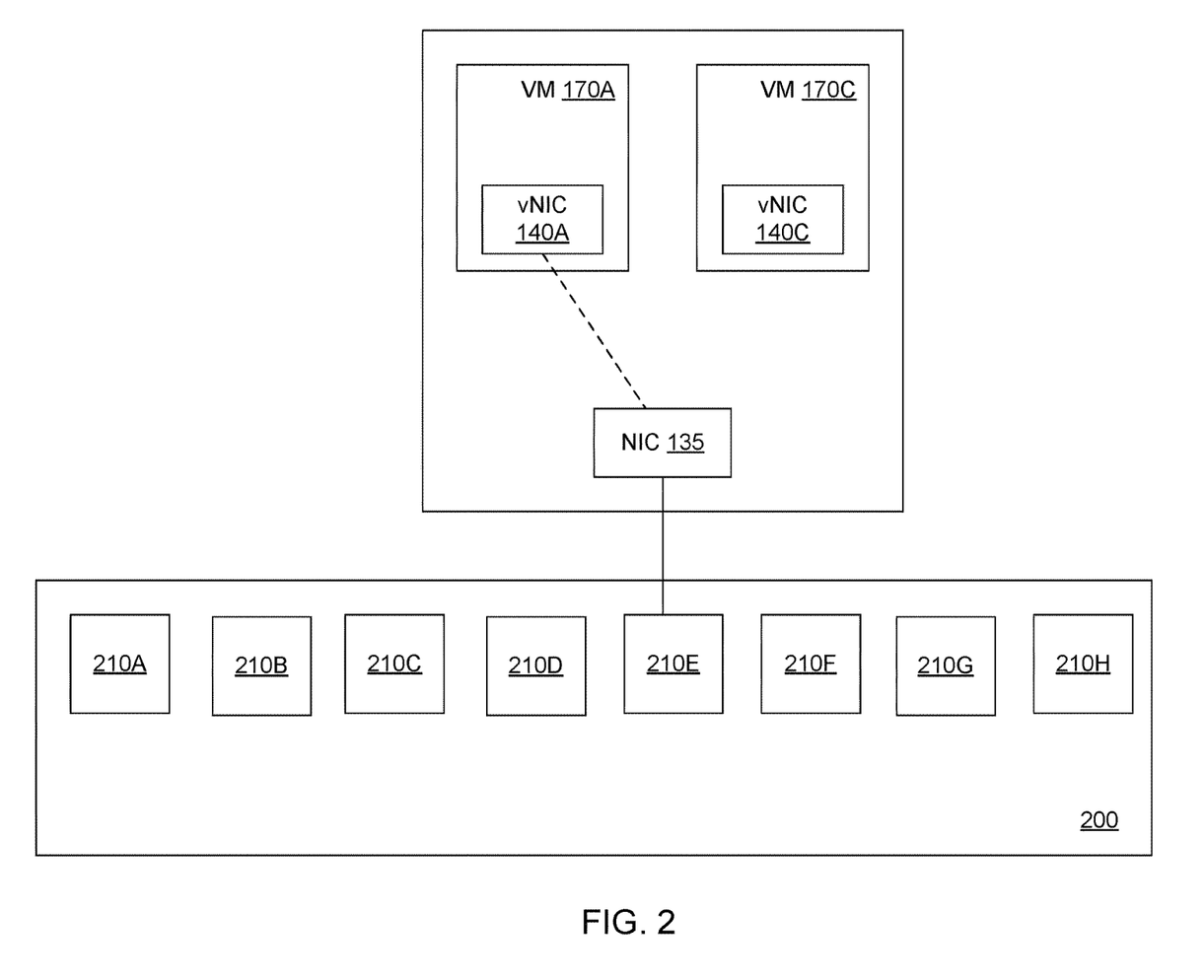
FIG. 2 is a schematic diagram illustrating an example mechanisms for communication between a virtual machine and a network device according to an implementation of the disclosure.

FIG. 2 depicts a schematic diagram illustrating an example 200 of a network device communicating with a virtual machine in accordance with some implementations of the disclosure. In some embodiments, network device 200 can be and/or include a data link layer device (such as an Ethernet switch and/or bridge). In response to receiving a notification including information about a new network location of a migrating virtual machine, network device 200 can update its internal data structure employed for data link layer frame forwarding, to reflect the new location of the network interface associated with the data link layer address specified by the notification. While a media access control (MAC) address and/or an Internet Protocol (IP) address of the virtual machine may not have to be changed after the migration, one or more network devices (e.g., one or more data link layer switches) may need to be reconfigured to facilitate communications for the virtual machine. For example, the destination host and the origin host may be connected to different switches and/or different switch ports. When the virtual machine is migrated to the destination host, the switch ports to which the destination host is connected may need to be reconfigured to be associated with the virtual machine. In some embodiments, network device 200 can be a network device 107 of FIG. 1A.

As illustrated in FIG. 2, network device 200 can include one or more switch ports 210A, 210B, 210C, 210D, 210E, 210F, 210G, 210H, etc. In the illustrative example of FIG. 2, network device 107 may associate (e.g., by an entry in a memory data structure) the data link layer address of virtual network interface 140A of virtual machine 170A and switch port 210E through which a notification comprising the data link layer address of virtual network interface 140A has been received. In certain implementations, network device 107 may further associate (e.g., by an entry in a memory data structure) one or more VLANs associated with virtual network interface 140A of virtual machine 170A and switch port 210 through which a notification comprising the data link layer address of virtual network interface 140A has been received.

Figure 3:
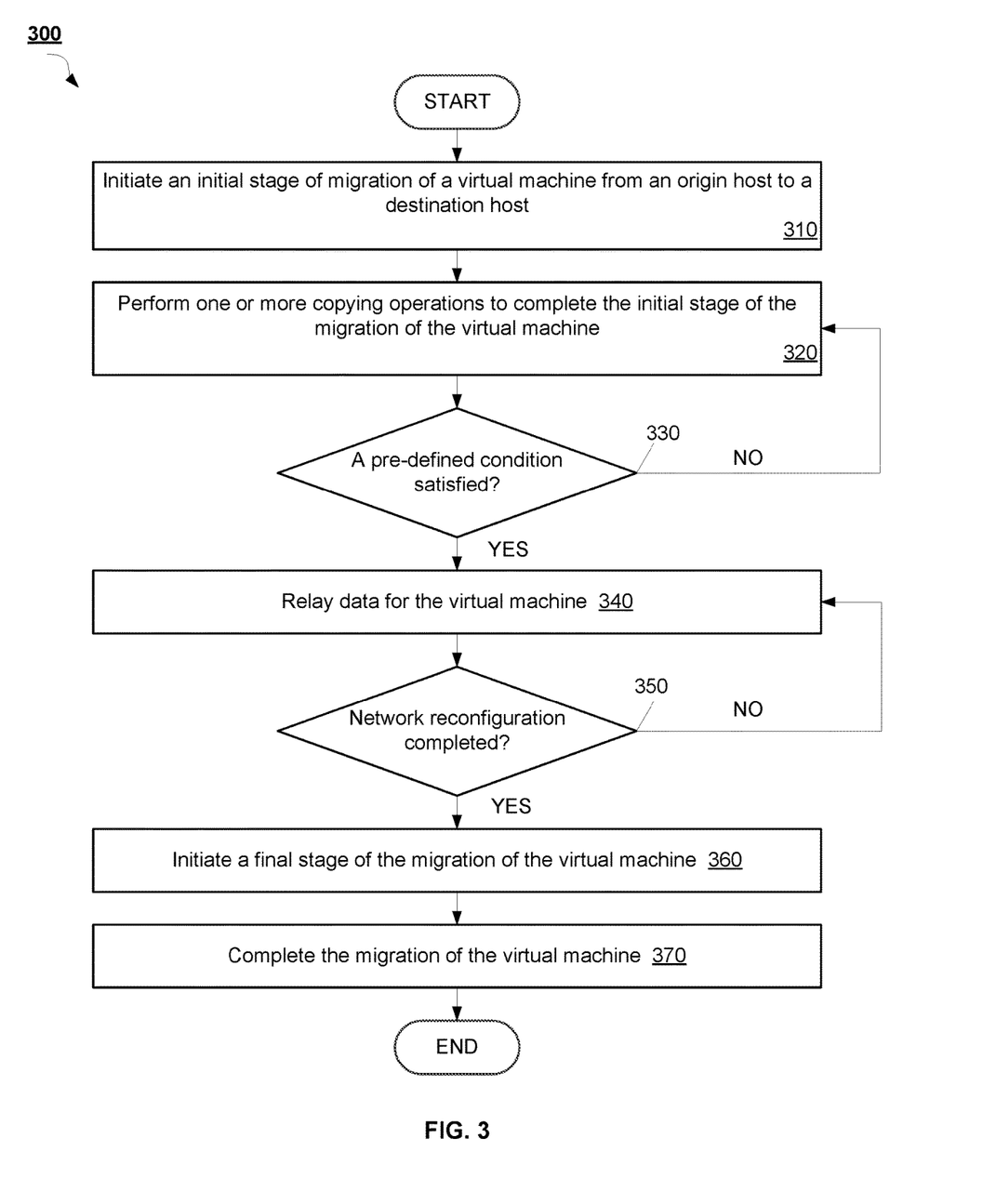
FIG. 3 is a flow diagram illustrating a method for virtual machine migration by an origin hypervisor according to an implementation of the disclosure.

FIG. 3 is a flow diagram illustrating an example 300 of a method for virtual machine migration by an origin hypervisor according to some implementations of the disclosure. Method 300 may be performed by a computer system that may comprise hardware (e.g., circuitry, dedicated logic, and/or programmable logic), software (e.g., instructions executable on a computer system to perform hardware simulation), or a combination thereof. Method 300 and/or each of its individual functions, routines, subroutines, or operations may be performed by one or more processors of the computer system executing the method (e.g., computer system 100A of FIG. 1A). In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other. In some embodiments, method 300 can be performed by host migration agent 125A of FIG. 1A.

Method 300 may begin at block 310 where an origin hypervisor initiates an initial stage of migration of a virtual machine from an origin computer system to a destination computer system. The origin hypervisor can initiate the initial stage of the migration by performing any operation related to the migration. For example, the initial stage of the migration of the virtual machine can be initiated by starting to copy an execution state of the virtual machine from a source memory (e.g., a memory associated with the origin computer system) to a destination memory (e.g., a memory associated with the destination computer system).

At block 320, the origin hypervisor can perform one or more copying operations for the initial stage of the migration of the virtual machine. For example, the origin hypervisor can transmit the execution state of the virtual machine to the destination hypervisor. The execution state of the virtual machine may include, for example, the memory state, the virtual processor state, the virtual devices state, and/or the network connectivity state of the virtual machine.

At block 330, the origin hypervisor can determine whether a pre-defined condition is satisfied. The satisfaction of the pre-defined condition may indicate completion of the initial stage of the migration of the virtual machine. The pre-defined condition may include, for example, a memory pages modifying rate becoming less than a pre-defined threshold rate, the memory pages modifying rate being less than or equal to the network throughput, etc.

In some embodiments, in response to determining that the pre-defined condition is not satisfied, the origin hypervisor can loop back to block 320 and can perform one or more copying operations to complete the initial stage of the migration of the virtual machine. Alternatively, in response to determining that the pre-defined condition is satisfied, the origin hypervisor can proceed to block 340. In some embodiments, the origin hypervisor can also send, to the destination hypervisor, a message indicative of satisfaction of the pre-defined condition and/or completion of the initial stage of the migration of the virtual machine.

At block 340, the origin hypervisor can relay data for the virtual machine. For example, the migration agent can receive, from the virtual machine, a first data packet addressed to a network device. The origin hypervisor can forward the first data packet to the destination hypervisor (e.g., via a migration agent of the destination hypervisor and/or a host controller). In some embodiments, the destination hypervisor can forward the first data packet to the network device. As another example, the origin hypervisor can receive, from the destination hypervisor, a second data packet addressed to the virtual machine. The origin hypervisor can then forward the second data packet to the virtual machine.

At block 350, the origin hypervisor can determine whether network reconfiguration has been completed for the migration of the virtual machine. For example, the origin hypervisor can determine that the network reconfiguration has been completed in response to determining that the destination hypervisor has received a threshold amount of data addressed to the virtual machine. As another example, the origin hypervisor can determine that the network reconfiguration has been completed in response to receiving a message indicating completion of the network reconfiguration. The message can be generated by the destination hypervisor in some embodiments.

In some embodiments, the origin hypervisor can loop back to block 340 in response to determining that the network reconfiguration has not been completed. In some embodiments, in response to determining that the network reconfiguration has been completed at block 350, the origin hypervisor can proceed to block 360 and can initiate a final stage of the migration of the virtual machine. For example, the origin hypervisor can stop the virtual machine on the origin computer system and/or disassociate the virtual machine from the origin hypervisor. The origin hypervisor can also send, to the destination hypervisor, a notification indicating that the final stage of the migration is to be initiated.

At block 370, the origin hypervisor can perform one or more operations to complete the migration of the virtual machine. For example, the origin hypervisor can copy data related to the virtual machine to the destination hypervisor (e.g., by copying one or more remaining modified pages to the destination hypervisor).

Figure 4:
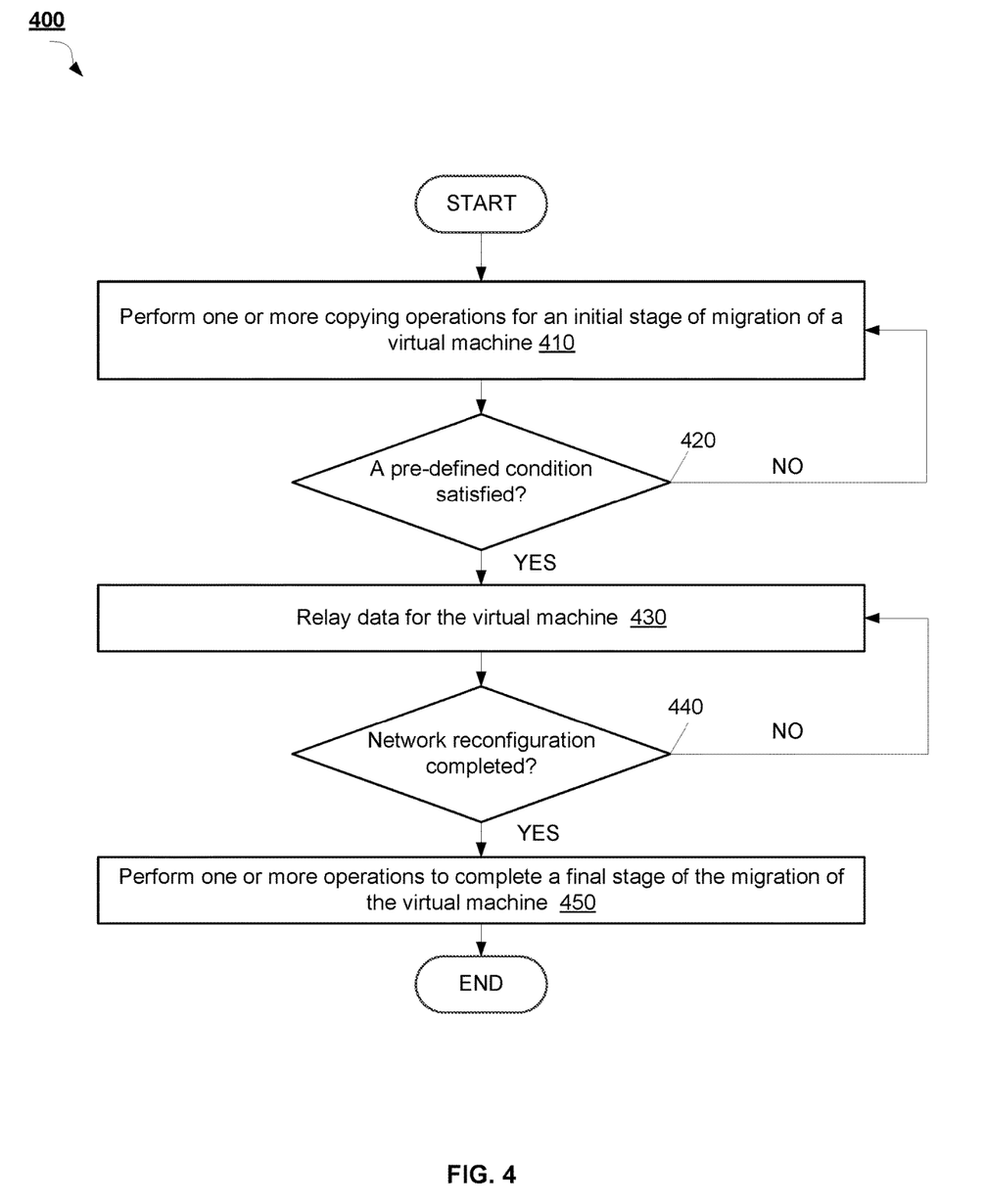
FIG. 4 is a flow diagram illustrating a method for virtual machine migration by a destination hypervisor according to an implementation of the disclosure.

FIG. 4 is a flow diagram illustrating an example 400 of a method for virtual machine migration by a destination hypervisor according to some implementations of the disclosure. Method 400 may be performed by a computer system that may comprise hardware (e.g., circuitry, dedicated logic, and/or programmable logic), software (e.g., instructions executable on a computer system to perform hardware simulation), or a combination thereof. Method 400 and/or each of its individual functions, routines, subroutines, or operations may be performed by one or more processors of the computer system executing the method (e.g., computer system 100B of FIG. 1A). In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other. In some embodiments, method 400 can be performed by host migration agent 125B of FIG. 1A.

Method 400 begins at block 410 where a destination hypervisor performs one or more copying operations for a migration of a virtual machine from an origin host computer system to a destination host computer system. The copying operations can be performed to complete an initial stage of the migration. The destination hypervisor can perform a copying operation, for example, by receiving an execution state of the virtual machine from an origin hypervisor. The destination hypervisor can store the execution state in a memory associated with the destination hypervisor. The host computer system may or may not be the same as the destination computer system.

At block 420, the destination hypervisor can determine whether a pre-defined condition is satisfied. The satisfaction of the pre-defined condition can indicate completion of the initial stage of the migration of the virtual machine. In some embodiments, the destination hypervisor can make the determination by performing one or more operations described in connection with block 330 of FIG. 3. In some embodiments, the destination hypervisor can make the determination based on information provided by an origin hypervisor (e.g., a message indicative of satisfaction of the pre-defined condition and/or completion of the initial stage of the migration process).

In some embodiments, in response to determining that the pre-defined condition is not satisfied and/or that the initial stage of the migration is incomplete, the destination hypervisor can loop back to 410 and can continue copying data for the migration of the virtual machine. Alternatively, in response to detecting the completion of the initial stage of the migration process, the destination hypervisor can proceed to 430 and can relay data for the virtual machine. For example, the destination hypervisor can receive, from the origin hypervisor, a first data packet transmitted from the virtual machine to a network device. The destination hypervisor can then transmit the first data packet to the network device. As another example, the destination hypervisor can receive, from a network device, a second data packet addressed to the virtual machine and can transmit the second packet to the origin hypervisor.

At block 440, the destination hypervisor can determine whether network reconfiguration has been completed for the migration of the virtual machine. For example, the destination hypervisor can determine the completion status of the network reconfiguration based on the data relayed by the destination hypervisor for the virtual machine. More particularly, for example, the destination hypervisor can determine that it has received a particular amount of data addressed to the virtual machine. The destination hypervisor can determine that the network reconfiguration has been completed in response to determining that the particular amount is equal to or greater than a threshold amount of data. Alternatively, the destination hypervisor can determine that the network reconfiguration is incomplete in response to determining that the particular amount is less than the threshold amount.

In some embodiments, the destination hypervisor can loop back to 430 and can continue relaying data for the virtual machine in response to determining that the network reconfiguration has not been completed. Alternatively, in response to determining that the network reconfiguration has been completed, the destination hypervisor can proceed to 450. The destination hypervisor can also send, to the origin hypervisor, a message indicating completion of the network reconfiguration.

At block 450, the destination hypervisor can perform one or more operations to complete a final stage of the migration process. For example, the destination hypervisor can start the virtual machine on the destination computer system. As another example, the destination hypervisor can receive, from the origin hypervisor, data related to the virtual machine (e.g., one or more remaining modified memory pages).

Figure 5:
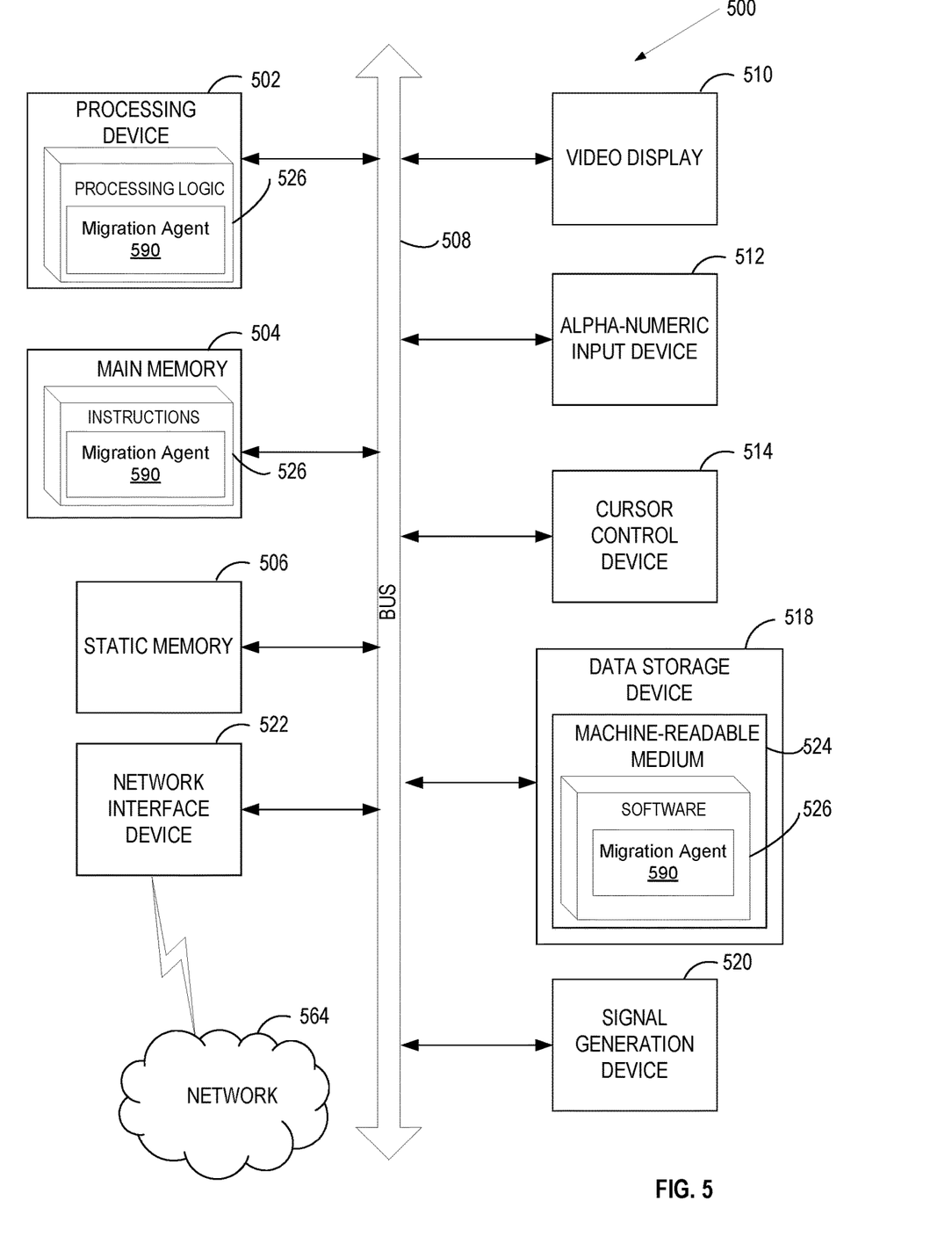
FIG. 5 illustrates a block diagram of one implementation of a computer system.

FIG. 5 illustrates a diagrammatic representation of a machine in the example form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 500 includes a processing device 502 (e.g., processor, CPU, etc.), a main memory 504 (e.g., read-only memory (ROM), flash memory, dynamic random access memory (DRAM) (such as synchronous DRAM (SDRAM) or DRAM (RDRAM), etc.), a static memory 506 (e.g., flash memory, static random access memory (SRAM), etc.), and a data storage device 518, which communicate with each other via a bus 508.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 522 communicably coupled to a network 564. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 518 may include a machine-accessible storage medium 524 on which is stored software 526 embodying any one or more of the methodologies of functions described herein. The software 526 may also reside, completely or at least partially, within the main memory 504 as instructions 526 and/or within the processing device 502 as processing logic 526 during execution thereof by the computer system 500; the main memory 504 and the processing device 402 also constituting machine-accessible storage media.

The machine-readable storage medium 524 may also be used to store instructions 526 to perform virtual machine migration, such as migration agent 590, and/or a software library containing methods that call the above applications. Migration agent 530 can be implemented as the host migration agents 125A, 125B, and/or 125C as described with respect to FIGS. 1-2. While the machine-accessible storage medium 524 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending," "receiving," "creating," "migrating," "providing," "executing," "copying," "storing," "determining," "associating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first," "second," "third," "fourth," etc. as used herein are meant as labels to distinguish among different elements and may not necessarily have an ordinal meaning according to their numerical designation.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method, comprising:
   initiating, by a processing device, a migration of a virtual machine from an origin computer system comprising an origin hypervisor to a destination computer system comprising a destination hypervisor;
   relaying, by the origin hypervisor, an outgoing data packet of the virtual machine to the destination hypervisor;
   initiating, by the destination hypervisor, a transmission of the outgoing data packet by the destination computer system while the virtual machine is executing on the origin computer system;
   detecting, by the destination hypervisor, a receipt of an incoming data packet for the virtual machine at the destination computer system while the virtual machine is executing on the origin computer system; and
   initiating the execution of the virtual machine on the destination computer system after the detecting.

2. The method of claim 1, further comprising transmitting, by the destination hypervisor, a notification message related to the migration of the virtual machine over a network.

3. The method of claim 2, wherein the notification message comprises a Media Access Control (MAC) address of the virtual machine.

4. The method of claim 1, further comprising:
   determining, by the processing device, whether network reconfiguration has been completed for the migration of the virtual machine;
   stopping, by the origin hypervisor, the virtual machine on the origin computer system in response to determining that the network reconfiguration has been completed; and
   starting, by the destination hypervisor running on the destination computer system, the virtual machine on the destination computer system.

5. The method of claim 4, wherein determining whether the network reconfiguration has been completed comprises determining at least one of:
   whether the destination hypervisor has received a threshold amount of data addressed to the virtual machine; or
   whether the destination hypervisor has received data addressed to the virtual machine from a threshold number of network devices.

6. The method of claim 5, wherein determining whether the destination hypervisor has received the threshold amount of data addressed to the virtual machine further comprises determining whether the destination hypervisor has received a threshold number of data packets addressed to the virtual machine.

7. The method of claim 5, wherein determining whether the destination hypervisor has received the threshold amount of data addressed to the virtual machine further comprises determining whether the destination hypervisor has received the threshold amount of data in a predetermined time period.

8. The method of claim 5, further comprising, responsive to determining that the network reconfiguration has not been completed, relaying an incoming data packet for the virtual machine from the destination hypervisor to the origin hypervisor.

9. The method of claim 8, wherein relaying the incoming data packet for the virtual machine comprises:
   receiving, from the destination hypervisor, a first data packet addressed to the virtual machine; and
   transmitting, from the destination hypervisor, the first data packet to the origin hypervisor that is managing the virtual machine on the origin computer system.

10. The method of claim 8, wherein relaying the outgoing data packet of the virtual machine comprises:
    detecting, by the origin hypervisor, the outgoing data packet of the virtual machine, wherein the outgoing data packet is addressed to a network device; and
    transmitting, by the origin hypervisor, the outgoing data packet of the virtual machine to the destination hypervisor.

11. The method of claim 10, further comprising transmitting, by the destination hypervisor, the outgoing data packet to the network device.

12. A system, comprising:
    a memory; and
    a processing device, communicably coupled to the memory, to:
    initiate migration of a virtual machine from an origin computer system comprising an origin hypervisor to a destination computer system comprising a destination hypervisor;
    relay an outgoing data packet of the virtual machine from the origin hypervisor to the destination hypervisor;
    initiate a transmission of the outgoing data packet by the destination computer system while the virtual machine is executing on the origin computer system;
    detect a receipt of an incoming data packet for the virtual machine at the destination computer system while the virtual machine is executing on the origin computer system; and
    initiate the execution of the virtual machine on the destination computer system after the detecting.

13. The system of claim 12, wherein the processing device is further to initiate a transmission, by the destination hypervisor, of a notification message related to the migration of the virtual machine.

14. The system of claim 13, wherein the notification message comprises a Media Access Control (MAC) address of the virtual machine.

15. The system of claim 12, wherein to relay the outgoing data packet of the virtual machine, the processing device is further to:
    receive, by the destination hypervisor, the outgoing data packet of the virtual machine from the destination hypervisor, wherein the outgoing data packet is addressed to a network device on a network; and
    transmit, by the destination hypervisor, the outgoing data packet over the network.

16. The system of claim 15, wherein to relay the outgoing data packet for the virtual machine, the processing device is further to transmit, via the destination hypervisor, the outgoing data packet of the virtual machine to the network device.

17. The system of claim 12, wherein the processing device is further to:
determine whether network reconfiguration has been completed for the migration of the virtual machine;
stopping, by the origin hypervisor, the virtual machine on the origin computer system in response to determining that the network reconfiguration has been completed; and
starting, by the destination hypervisor running on the destination computer system, the virtual machine on the destination computer system.

18. The system of claim 17, wherein the processing device is further to:
responsive to determining that the network reconfiguration has not been completed, cause the destination hypervisor to relay an incoming data packet for the virtual machine to the origin hypervisor that is managing the virtual machine on the origin computer system.

19. The system of claim 18, wherein to relay the incoming data packet for the virtual machine, the processing device is further to:
receive, by the destination hypervisor, a first data packet addressed to the virtual machine; and
transmit, by the destination hypervisor, the first data packet to the origin hypervisor that is managing execution of the virtual machine on the origin computer system.

20. A non-transitory machine-readable storage medium including instructions that, when accessed by a processing device, cause the processing device to:
initiate a migration of a virtual machine from an origin computer system comprising an origin hypervisor to a destination computer system comprising a destination hypervisor;
relay an outgoing data packet of the virtual machine from the origin hypervisor to the destination hypervisor;
initiate a transmission of the outgoing data packet from the destination computer system while the virtual machine is executing on the origin computer system;
detect a receipt of an incoming data packet for the virtual machine at the destination computer system while the virtual machine is executing on the origin computer system; and
initiate the execution of the virtual machine on the destination computer system after the detection.

\* \* \* \* \*